United States Patent [19]

Miree

[11] Patent Number: 4,541,555

[45] Date of Patent: Sep. 17, 1985

[54] METHOD AND APPARATUS FOR MOUNTING FLASHLIGHTS TO BICYCLES

[76] Inventor: Mallory F. Miree, 3512 Springhill Rd., Birmingham, Ala. 35223

[21] Appl. No.: 559,098

[22] Filed: Dec. 7, 1983

[51] Int. Cl.⁴ .............................................. F21V 33/00
[52] U.S. Cl. .................................... 224/41; 224/30 A; 362/72
[58] Field of Search ............ 280/289 H; 224/41, 273, 224/901, 902, 30 R, 30 A, 35, 36, 39, 904, 907, 42.45 R, 909; 362/193, 72; 248/103, 180, 178, 185, 214, 218.4, 219.2, 503

[56] References Cited

U.S. PATENT DOCUMENTS

| | | | |
|---|---|---|---|
| 1,061,102 | 5/1913 | Morton et al. | 248/185 |
| 1,222,458 | 4/1917 | Peterson | 224/41 X |
| 1,332,201 | 3/1920 | Borgarello | 248/185 X |
| 1,735,212 | 11/1929 | Pawsat | 224/41 K |
| 2,220,220 | 11/1940 | Cusimano | 224/42.45 R |
| 2,270,931 | 1/1942 | Corcoran | 224/909 X |
| 2,401,041 | 5/1946 | Belau | 248/178 |
| 2,588,671 | 3/1952 | Tringali | 224/30 R |
| 2,621,881 | 12/1952 | Bussmann | 248/219.4 |
| 2,778,931 | 1/1957 | Cruz | 248/185 X |
| 2,788,763 | 4/1957 | Ries | 280/289 H |
| 3,258,235 | 6/1966 | Mozley, III | 248/180 X |
| 3,427,024 | 2/1969 | Cross | 248/214 X |
| 3,620,491 | 11/1971 | Baclit | 248/104 X |
| 3,810,559 | 5/1974 | Stanton | 224/41 |
| 4,170,337 | 10/1979 | Davis | 362/72 X |
| 4,176,770 | 12/1979 | Griggs et al. | 224/30 A |
| 4,390,927 | 6/1983 | Von Feldt | 362/72 |

FOREIGN PATENT DOCUMENTS 285978  9/1952  Switzerland ............... 280/289 H

Primary Examiner—Stephen Marcus
Assistant Examiner—Robert Petrik
Attorney, Agent, or Firm—Thomas & Kennedy

[57] ABSTRACT

A method and apparatus for readily and securely mounting and dismounting a flashlight and its mounting apparatus to a bicycle along a fore and aft axis. The apparatus includes a T-shaped support having upper and lower sections pivotably secured together, and a binding strap provided with self-fastening materials.

21 Claims, 6 Drawing Figures

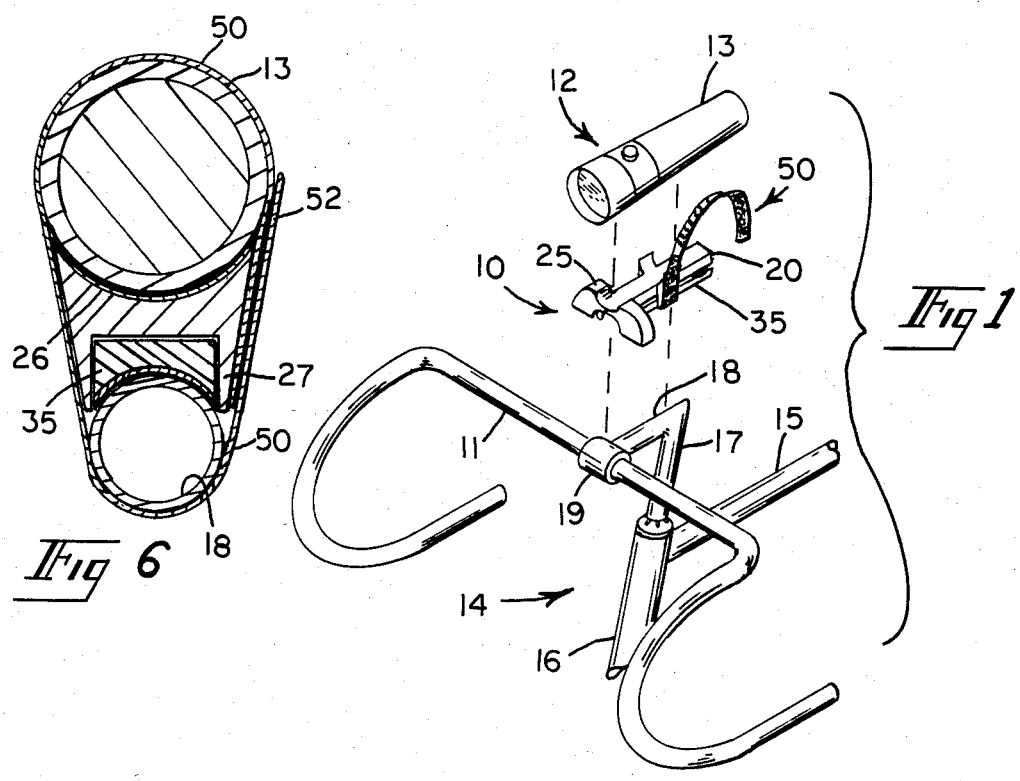
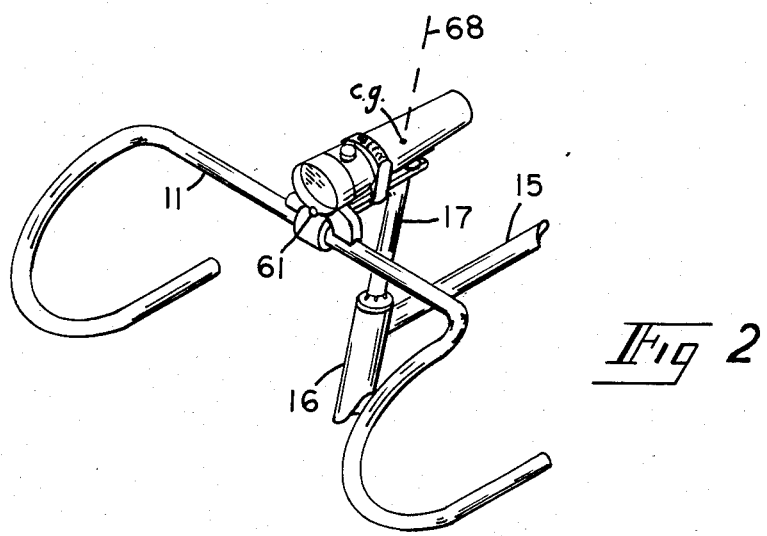

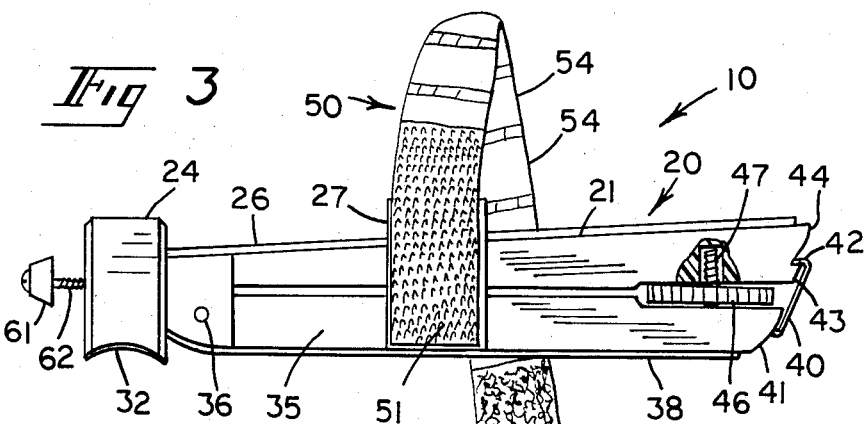
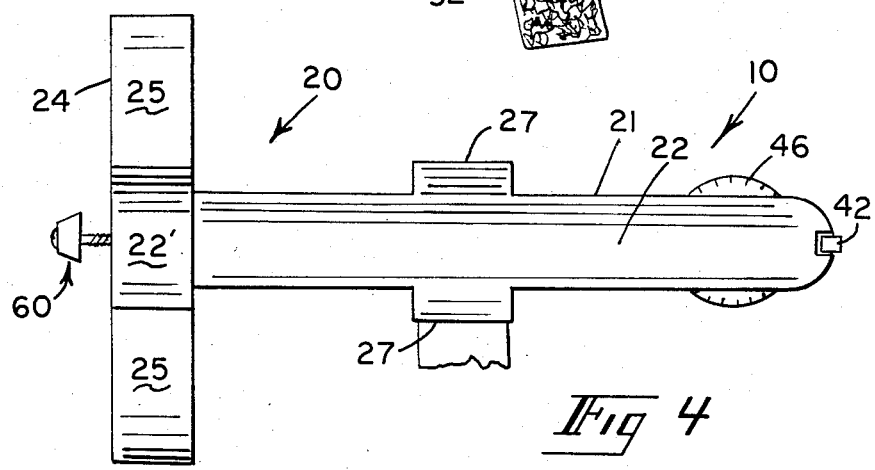
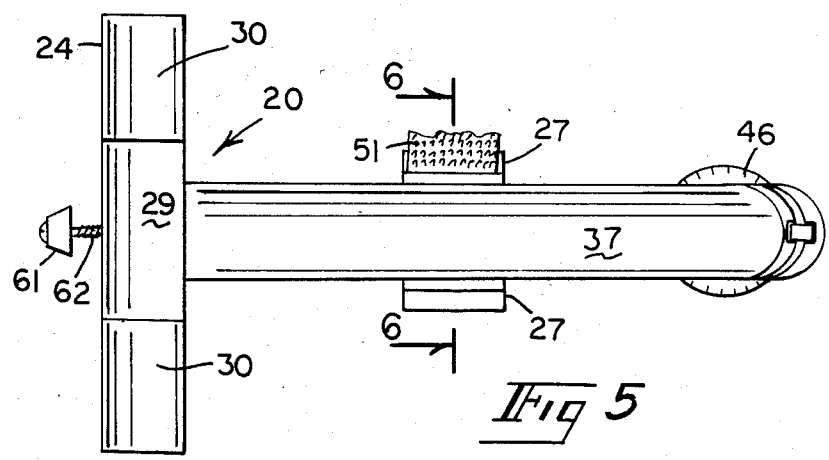

METHOD AND APPARATUS FOR MOUNTING FLASHLIGHTS TO BICYCLES

TECHNICAL FIELD

This invention relates to methods and apparatuses for mounting lamps such as flashlights to bicycles.

BACKGROUND OF THE INVENTION

Apparatuses have heretofore been developed for mounting dry cell battery powered flashlights to bicycles in various manners. For example, some mounting devices have been developed for mounting flashlights to bicycles to provide oscillatory types of safety lamps. Exemplary of these are those disclosed in U.S. Pat. Nos. 2,788,763 and 2,811,633. Apparatuses have also been developed for mounting flashlights to the rears of bicycles to provide taillights. U.S. Pat. No. 2,728,824 explifies these types of mounts. Still other apparatuses have been devised for mounting flashlights to bicycles to provide headlights as exemplified by those disclosed in U.S. Pat. Nos. 1,449,509 and 4,170,337. The present invention specifically relates to the last mentioned type of mounting devices.

The prior art apparatuses used in mounting bicycle headlights have had a number of deficiencies. For example, being secured as with nuts and bolts to the bicycles, they have required the use of tools such as pliers to mount them. In addition, those to which flashlights are not permanently mounted, like that shown in U.S. Pat. No. 4,170,337, have also required the manipulation of other fastening means, such as wing nuts and the like, to mount the flashlights securely to the mounts once the mounts themselves have been mounted, and to dismount the flashlights from the mounts. Thus, even when the flashlights are dismounted the mounts typically remain on the bicycles. Not only are such naked mounts unsightly but they provide dead weight.

The stability of the prior art mounting apparatuses has also been lacking. Once mounted the flashlights have often not been located along a fore and aft axis of the bicycle, being in the plane in which the bike wheels lie when mutually aligned. With the advent of modern light-weight, high-speed bicycles the mounting of relatively heavy flashlights, fully loaded with batteries, off of their fore and aft axes has provided an adverse imbalance that is clearly discernable by discriminating riders. In addition to being off-axis they have also been mounted at some distance from the axes of the upright front wheel steering stems thereby creating moments of inertia about the stem axes each time the bicycles strike bumps or depressions in the roadway. This has tended to loosen the flashlights from their mounts as well as the mounts from the bicycles.

In addition to the foregoing, the flashlight mounting apparatuses of the prior art have not possessed the capability of enabling a rider to alter flashlight tilt readily while riding so as to effect changes in beam angle. Some of the devices have also been lacking in versatility with regard to their ability to mount flashlights of different shapes and sizes without having to interchange mount parts. Still others have also had a tendency to scratch or mar the bicycles. Accordingly, it is to the provision of apparatuses and methods of mounting flashlights to bicycles which overcome these deficiencies of the prior art to which the present invention is primarily directed.

SUMMARY OF THE INVENTION

In one form of the invention apparatus for mounting a flashlight to a bicycle having a steering stem formed with a collar through which handlebars extend comprises a support having a bottom surface contoured to be seated snugly atop the bicycle steering stem neck adjacent the neck collar and a concave upper surface in which a flashlight may be nestled. The apparatus also comprises a flexible strap bearing fastening means. The strap is secured to the support and is of a sufficient length as to be wrapped over a flashlight nestled in the support concave upper surface and under the bicycle stem neck atop which the support is snugly seated and secured to itself by the fastening means.

In another form of the invention apparatus for mounting a flashlight to a bicycle along a bicycle axis comprises an elongated base having a bottom surface contoured to be seated snugly atop the bicycle steering stem neck with a rear base end located adjacent the stem and a forward base end located adjacent a neck collar. The apparatus also includes an elongated cradle having a concave top surface in which a flashlight may be nestled. The cradle is pivotably mounted atop the base along a pivot axis located adjacent the base forward end and a forward end of the cradle. Means are also provided for adjusting the height of the cradle rear end with respect to the base rear end whereby the angle of the tilt of the flashlight nestled atop the cradle may be altered. Binding means are provided for binding both the base to the bicycle neck and a flashlight to the cradle.

In yet another form of the invention apparatus for mounting a flashlight to a bicycle of the type having a neck that extends from an upright stem to a neck collar through which handlebars extend comprises a T-shaped support having a trunk and a crossarm with the bottom surface of the trunk being contoured to be seated flush atop the bicycle neck and with the bottom surface of the crossarm being contoured to be seated flush atop the bicycle neck collar. A self-adherent elastic strap is mounted at one end to the support which is of the length sufficient to encircle the support, a flashlight mounted atop the support and a neck atop which the support is mounted.

In still another form of the invention a method of mounting a flashlight to a bicycle comprises the steps of placing a flashlight support atop the bicycle steering stem neck and neck collar through which handlbars extend, placing a flashlight atop the support along the bicycle axis with the flashlight center of gravity preferably located substantially along the axis of the bicycle stem, and releaseably binding together the bicycle stem neck, flashlight support and flashlight.

BRIEF DESCRIPTION OF THE DRAWING

FIG. 1 is a disassembled view, in perspective, of a steering portion of a bicycle, flashlight mounting apparatus embodying principles of the present invention, and a flashlight.

FIG. 2 is an assembled view, in perspective, of the devices illustrated in FIG. 1.

FIG. 3 is a side elevational view of the flashlight mounting apparatus depicted in FIG. 1.

FIG. 4 is a plan view of the flashlight mounting apparatus shown in FIG. 1.

FIG. 5 is a bottom view of the flashlight mounting apparatus shown in FIG. 1.

FIG. 6 is a cross-sectional view of the assembly shown in FIG. 2 taken along the plane 6—6 identified in FIG. 5.

DETAILED DESCRIPTION

Referring now in detail to the drawing, there is shown apparatus indicated generally at 10 for mounting a flashlight 12 to a bicycle 14 along a front to rear axis lying within the vertical plane in which the bicycle wheels lie when aligned and along which plane the bicycle tubular frame member 15 also lies. The bicycle is seen to have a steering column 16 from which emerges a steering stem 17 that is formed with a neck 18 that terminates with a collar or clamp 19 from which handlebars 11 laterally extend. The mounting apparatus is essentially a T-shaped support. More specifically, it comprises an elongated cradle 20 of a generally T-shaped configuration having an elongated trunk 21 formed with a concave upper surface 22 which trunk merges with a laterally extending crossarm 24 having convex upper surfaces 25 that straddle a concave upper surface 22' that merges with trunk surface 22. The degree of curvature of surfaces 22 and 22' is made to match generally that of the surface of casing 13 of the flashlight 12 which casing is normally cylindrical. The surfaces 22 and 22' are preferably convered with a resilient pad 26. The cradle is also formed with two side wings 27 whose upper surfaces are also concave so as to merge laterally with the concave upper surface 22. The bottom surface of the crossarm portion of the cradle, as shown in FIG. 5, has a concave central portion 29 and two other concave portions 30 that straddle portions 29. The portion 29 is contoured to match generally the surface of the bicycle neck collar 19 while portions 30 are contoured to match generally that of handlebars 11. The bottom surfaces of the crossarm 24 are also covered with a resilient pad 32. These various pads, which are secured to the cradle by adhesive, are not shown in FIGS. 4 and 5, for clarity of explanation.

With continued reference to the drawing the apparatus is seen also to include a base indicated generally at 35 which, like the cradle, is preferably formed of plastic. The base 35 is pivotably mounted to the cradle by a pivot pin 36. The bottom surface 37 of the base is concave and covered with a resilient pad 38 that also is not shown in FIG. 5. A tang 40 is rigidly mounted to the rear end 41 of the base which has a reentrant projection or lip 42 which overlays a step 43 formed in the rear end 44 of the cradle. This construction enables the lip 42 to serve as a stop in limiting pivotable movement of the cradle rear end away from the base rear end. A thumbscrew 46 is threaded upon a post 47 whose bottom end is rigidly mounted to the base 35 and whose upper end extends into a recess formed in the cradle 20, as shown in FIG. 3. The thumbscrew provides means for changing the elevation and the rear end of the cradle 20 with respect to the base 35 by pivotable movement about pivot pin 36. Again, such pivotal movement is limited by the stop action of the lip 42 of tang 40.

With continued reference to the drawing the mounting apparatus is further seen to include a strap indicated generally at 50 which has one end 51 secured as by adhesive to one wing 27 of the cradle. This permanently attached end 51 of the strap is formed with a self-fastening material as is its opposite, free end 52. Preferably, mating Velcro strips are used for self-fastening materials. So constructed, the two strap ends may be releasably fastened by merely pressing them flushly together. Velcro, as is well know, is formed of two mating strips of fibrous material with one being composed of a mass of hook-like fibrous anchors and the other of matting material. The two strap ends 51 and 52 are connected by an elastic section 54. The length of the entire strap is sufficient to enable it to encircle the cylindrical casing 13 of the flashlight 12, the bicycle stem neck 18 as well as the mounting apparatus itself, and the two strap ends 51 and 52 to be overlaid and releasably fastened together as shown in FIGS. 2 and 6. It should be noted that when this is done the strap not only encircles the assembly but does so in almost continuous contact therewith as shown in FIG. 6.

Finally, the apparatus is seen to include a screw 60 having a head 61 formed on an end of a threaded shank 62. A portion of the head 61 is located above the bottom of the upper concave surface 22 of the cradle to provide an adjustable stop for the front end of the flashlight 12, as shown in FIG. 2.

In use the apparatus is placed flush atop the bicycle neck 18 the neck collar 19 and the handlebars 11. This is done quite securely since the bottom surface 37 of the base is contoured to fit snugly atop the upper surface of the neck 18 and the bottom surfaces 29 and 30 of the cradle crossbar contoured to fit snugly atop the bicycle neck collar 19 and handlebars 11, respectively. Slight size differences in bicycle necks and neck collar diameters matter little in view of the provision of the pads. The flashlight 12 may contemporaneously or before or afterwards be placed atop the cradle 20 with its cylindrical casing 13 nestled snugly within the concave surfaces 22 and 22' of the cradle and with the front end of the flashlight butted against screw head 61. The stop may then be adjusted to position the center of gravity c.g. of the flashlight along the axis 68 of bicycle stem 17 that projects upwardly out of the steering column 16. Again, slight mismatches between flashlight casing and cradle sizes are compensated by the pad 26.

Next, the strap 50 is wrapped tautly over the upper surface of the flashlight casing 13, wing 27, around the bottom of neck 18 and the strap end 52 pressed against and thereby fastened to strap end 51. The flashlight is now securely mounted to the bicycle as shown in FIGS. 2 and 6 with the strap almost continuously flush against the flashlight, mount and bicycle stem since the side walls of cradle wings 27 extend trangentially to the flashlight casing and the stem. To dismount the flashlight and the mounting apparatus the strap end 52 is merely peeled from strap end 51 and unwrapped from under the bottom of the bicycle neck and flashlight whereupon both the mounting apparatus as well as the flashlight are dismounted from the bicycle.

It thus is seen that a unique method and apparatus is now provided for mounting a flashlight to a bicycle. The apparatus is of relatively simple, economical and light-weight construction. It, as well as the flashlight which it holds, may be readily mounted and dismounted to a bicycle with manual facility and without the use of ancillary tools. Once mounted the flashlight is positioned along a fore and aft axis of the bicycle whereby translational equilibrium is not disrupted by the weights of the mount and of the flashlight being laterally off-axis. Furthermore, as the center of gravity of the flashlight is located upon the stem axis moments of inertia do not tend to be created that would tend to pitch the flashlight as the bicycle encounters depressions and bumps in the roadways over which it is driven. Its construction also provided a very high degree of stability of both the mounting apparatus as well as the flashlight once mounted to a bicycle with virtually no chance of the mount or the flashlight becoming loosen or falling from the bicycle unless the mount or flashlight itself is actually struck by some object.

It should, of course, be understood that the just described embodiment merely illustrates principles of the invention in one preferred form. Many modifications, additions and deletions may be made thereto without departure from the spirit and scope of the invention as set forth in the following claims.

I claim:

1. Apparatus for mounting a flashlight to a bicycle having a steering stem formed with a neck and with a collar through which handlebars extend, and with the apparatus comprising an elongaged support of a selected support length having a bottom surface contoured to be mated against the bicycle steering stem neck adjacent the collar and a concave upper surface in which a flashlight may be nestled, and a flexible strap secured substantially centrally of said selected support length to said support, said strap being of a sufficient strap length as to be wrapped over a flashlight nestled in said support concave upper surface and under the bicycle stem neck atop which the support is mated with one strap portion overlapping and fastened to another strap portion by fastening means whereby the strap is the sole essential element attaching the support to the bicycle and to the flashlight to the support.

2. The apparatus of claim 1 wherein said support bottom surface is concave.

3. The apparatus of claim 1 wherein said support is T-shaped and said support bottom surface has two concave surfaces with curvatures oriented normally to each other whereby one of said concave surfaces may be placed flushly upon the neck and the other concave surface placed flushly upon the collar.

4. The apparatus of claim 1 wherein said fastening means includes two strips of mutually interlocking fibrous materials with at least one strip having a mass of hooklike anchors.

5. The apparatus of claim 1 wherein said strap is at least partially elastic, wherein said support has upper and lower sections, and wherein said apparatus further comprises means for adjusting the position of said upper section with respect to said lower section.

6. Apparatus for mounting a flashlight to a bicycle along a bicycle axis comprising an elongated base having a bottom surface contoured to be seated snugly atop the bicycle steering stem neck with a rear base end located adjacent the stem and with a forward base end located adjacent the neck collar, an elongated cradle having a concave top surface, in which a flashlight may be nestled, pivotably mounted atop said base along a pivot axis located adjacent said base forward end and a forward end of said cradle, means for adjusting the height of a said cradle rear end with respect to said base rear end that includes a threaded post mounted atop said base upon which a thumbscrew is threaded between said cradle and said base whereby the angle of tilt of a flashlight nestled atop said cradle may be altered, and binding means for binding said base snugly to the bicycle stem neck and a flashlight snugly to said cradle so as to apply pressure to the thumbscrew and hold it in a preset position.

7. The apparatus of claim 6 wherein said binding means comprises an elastic strap.

8. The apparatus of claim 6 wherein said binding means comprises a strap having self-fastening means secured thereto.

9. The apparatus of claim 8 wherein said binding means comprises two strips of mutually interlocking fibrous materials.

10. The apparatus of claim 6 wherein said base bottom surface is concave.

11. The apparatus of claim 6 wherein said cradle forward end has a concave bottom surface contoured to be mounted upon a bicycle stem neck collar.

12. The apparatus claim 11 having a resilient pad mounted to said cradle forward end concave bottom surface.

13. That apparatus of claim 6 wherein said cradle is T-shaped with a crossarm portion formed at said cradle forward end adapted to be mounted upon a bicycle stem neck collar and portions of bicycle handlebars that extend out of each end of the collar.

14. The apparatus of claim 6 having stop means mounted to said base rear end for limiting the adjustable height of said cradle above said base.

15. The apparatus of claim 6 having adjustable stop means mounted to said cradle forward end against which an end of a flashlight nestled in said cradle concave top surface may be butted.

16. The apparatus of claim 6 wherein said cradle is formed with a pair of side wings whose lower portions closely straddle said base, and whose upper surface of upper portions provide concave extensions of said cradle concave top surface.

17. The apparatus of claim 16 wherein said wings have substantially planar side walls that are mutually convergent so as to lie along planes extending tangentially to the flashlight and the stem neck when mounted to a bicycle.

18. Apparatus for mounting a flashlight to a bicycle of the type having a neck that extends from an upright steering stem to a neck collar through which handlebars extend, and with said apparatus comprising a support having a trunk of a trunk length and a crossarm with the bottom surface of said trunk being contoured to be seated flush stop the bicycle neck in mating contact therewith and with the bottom surface of said crossarm being contoured to be seated flush atop the bicycle handlebars; and a self-fastening elastic strap mounted at one end to said support substantially centrally of said trunk length of a length sufficient to encircle the support, a flashlight mounted atop said support, and a bicycle neck atop which said support is mounted whereby the strap is the sole essential element attaching the support to the bicycle and the flashlight to the support.

19. The apparatus of claim 18 wherein the top surface of said support trunk is contoured to receive a cylindrical flashlight therewithin.

20. The apparatus of claim 19 having means for adjustably tilting a flashlight received in said trunk contoured to surface.

21. The apparatus of claim 18 wherein the bottom surface of said crossarm is contoured to be seated flush atop the bicycle neck collar and that portion of the handlebars that emerge from the collar.

* * * * *